Aug. 18, 1953  J. D. LINCOLN  2,649,131
MACHINE AND METHOD FOR PRODUCING
CONTINUOUS HONEYCOMB STRUCTURES
Filed March 27, 1948  2 Sheets-Sheet 1
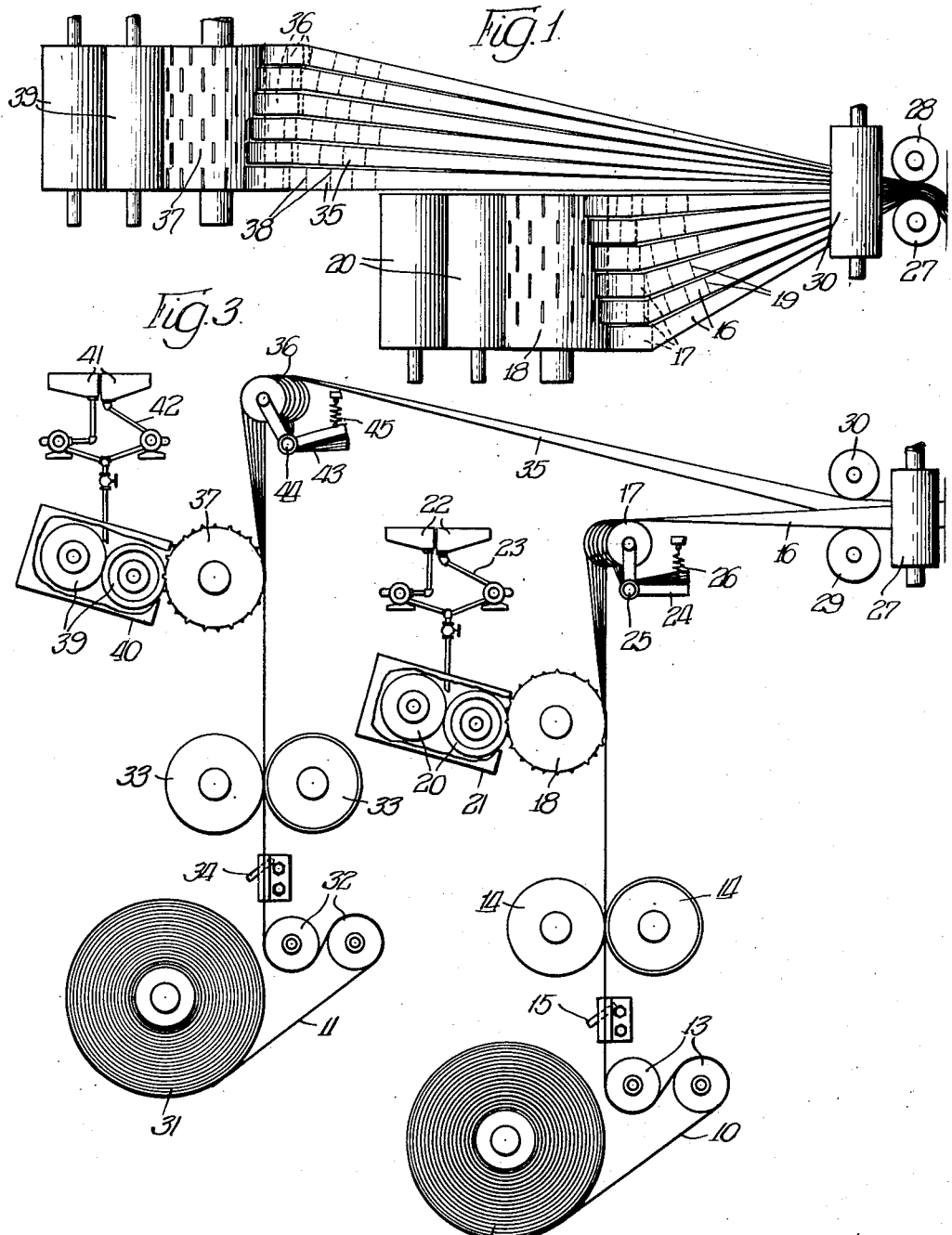
INVENTOR.
John D. Lincoln,
BY
Cromwell, Greist & Warden
Attys Aug. 18, 1953
J. D. LINCOLN
2,649,131
MACHINE AND METHOD FOR PRODUCING
CONTINUOUS HONEYCOMB STRUCTURES
Filed March 27, 1948
2 Sheets-Sheet 2
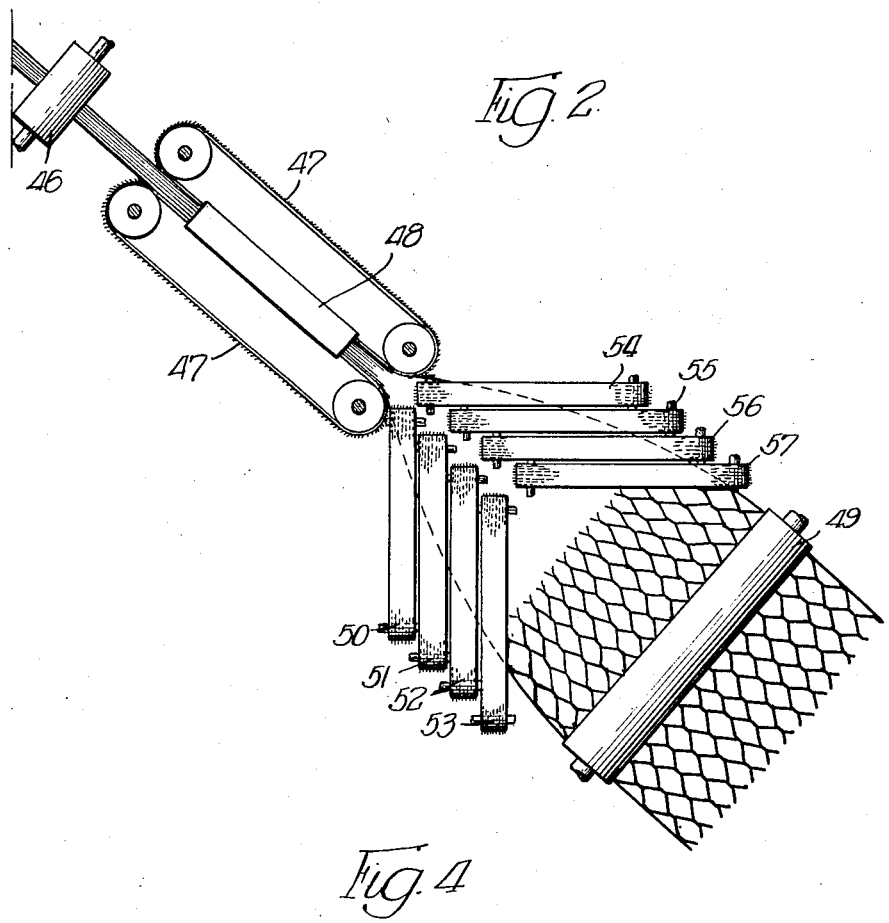
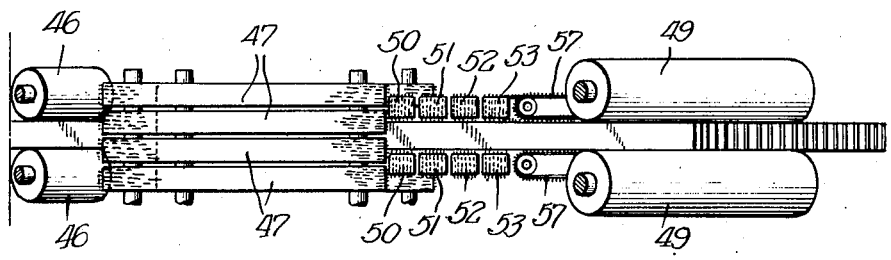
INVENTOR.
John D. Lincoln,
BY
Cromwell, Greist & Warden
ATTYS.

Patented Aug. 18, 1953

2,649,131

UNITED STATES PATENT OFFICE 2,649,131

MACHINE AND METHOD FOR PRODUCING CONTINUOUS HONEYCOMB STRUCTURES

John D. Lincoln, Marion, Va.

Application March 27, 1948, Serial No. 17,534

19 Claims. (Cl. 154—1)

This invention relates to a new and improved machine and method for automatically producing from one or more strips or webs of thin flexible sheet material a relatively thick rigid honeycomb structure in a continuous ribbon-like form.

It is a general object of the invention to provide a machine and method for progressively fabricating from one or more webs or strips of relatively thin paper-like material a relatively thick rigid cellular structure which is particularly adapted to be used as a core in the production of building panels, doors, tables, etc. and which may be used for a great many other purposes.

It is a specific object of the invention to provide a machine and method for fabricating from a paper-like material a relatively rigid honeycomb core structure wherein one or more continuously moving webs of the material are divided into a plurality of relatively narrow individual strips of a width substantially the same as the desired thickness of the core structure, transverse lines of adhesive are applied in staggered longitudinally spaced relation on the corresponding faces of adjacent strips, the strips are progressively turned through an angle of 180 degrees to bring them into edgewise position and then brought together in face-to-face relation to form a relatively thick compacted ribbon formation, the adhesive is set while the strips are held in compacted relation to connect the strips at longitudinally spaced points, after which the connected strips are expanded to form a honeycomb core structure and the honeycomb structure is finally treated with a rigidifying material while it is in expanded condition.

It is a further object of the invention to provide a machine and method of the type described wherein the compacted and connected strip formation is expanded by pairs of angularly related carding belts which engage the top and bottom surfaces of the material adjacent the outer margins thereof and expand the same to the desired width.

It is another object of the invention to provide a method and machine of the character described wherein the web of material is cut or slit, either before or after the application of the transverse adhesive lines, to divide the same into a plurality of relatively narrow individual strips or ribbons of material and the individual ribbons are thereafter engaged by separate adjustable means to control the tension therein and adjust the distance which the individual ribbons are required to travel to reach the point where they are brought into compacted relation whereby to insure proper transverse registry of the lines of adhesive at that point.

While the foregoing statements are indicative in a general way of the nature of the invention, other more specific objects and advantages will be apparent to those skilled in the art upon a full understanding of the new machine and method.

A preferred embodiment of the invention is presented herein for the purposes of exemplification, but it will, of course, be understood that such embodiment is susceptible of modification within the spirit and teaching of this disclosure without departing from the invention as defined in the appended claims.

In the accompanying drawings:

Figs. 1 and 2 taken together schematically illustrate in plan view a machine constructed in accordance with the invention for practicing the method of the invention; and Figs. 3 and 4 taken together are a side elevation of the machine.

The machine and method of the present invention have to do in a general way with the subject matter of the copending application of John D. Lincoln and George M. Thomson, Serial No. 272, filed January 2, 1948, now Patent No. 2,553,054, for a Machine and Method for Producing a Continuous Honeycomb Structure, which involves the fabrication of a similar core structure.

Referring to the drawings there is illustrated somewhat schematically a machine embodying the principles of the invention and by means of which the steps constituting the method of the invention may be conveniently carried out. The illustrated machine is designed to fabricate a cellular core structure of a width requiring the use of two rolls of web material of standard width. It will be understood that the machine and method may be designed to fabricate a core structure from a single roll of material of standard width and that for core structures of greater widths it may be designed to use any required number of rolls of the material of the same or varying widths. Since any number of additional rolls of material may be employed by mere duplication of certain parts of the apparatus and enlargement of the other parts, the detailed description will be limited to the illustrated machine which employs two webs of material 10 and 11 of standard width.

The web 10 is drawn from a supply roll 12 and first passes over a pair of heated calender rolls 13. A pair of driven pull rolls 14 vertically spaced from the calender rolls 13 applies a tension to the web 10 and controls the speed with which the web travels. A plurality of transversely spaced slitting knives 15 are arranged between the calender rolls 13 and the pull rolls 14 for dividing the web 10 into a plurality of individual strip portions or ribbons 16 of uniform width. The strips 16 are individually tensioned by directing them around the resiliently mounted rolls 17 which are arranged transversely of the path of travel of the material, a separate roll 17 being provided for each individual strip 16.

An adhesive applying roll 18 is arranged between the pull rolls 14 and the individual tension rolls 17 for applying transversely extending lines of adhesive 10 in longitudinally spaced relation on the individual strips 16. The lines of adhesive 19 are staggered on adjacent strips and the outermost strip is not supplied with the adhesive lines (Fig. 1). The adhesive material is supplied to the roll 18 by means of a pair of rolls 20 which are preferably encased in a refrigerated cabinet 21 and which are supplied by fountains 22 and a feed system 23. The adhesive is preferably a quick setting resin type material to which there is added the proper amount of a suitable catalyst. However, any other suitable adhesive may be used.

Each roll 17 is substantially the width of a strip 16. Each roll 17 is journaled on one arm of a bell crank 24. The bell cranks 24 are mounted to pivot individually about a common horizontal pivot line 25 and the other arm of each crank is acted upon by a tension spring 26. The tension in each spring 26 may be adjusted to properly position the roll 17 for the length of the path which the strip carried by it is required to travel and to provide proper tension in the individual strips 16. The strips 16 are turned 180° about the rolls 17 and move in a generally horizontal path to a pair of compacting rolls 27 and 28 which are arranged to rotate about a vertical axis on opposite sides of the strip material. In passing from the individual tension rolls 17 to the compacting rolls 27 and 28 the strips 16 are progressively turned to bring them into face-to-face edgewise relation. A pair of guide rolls 29 and 30 are mounted on horizontal axes above and below the strip material and adjacent the compacting rolls 27 and 28 to guide the edges of the strips.

The web 11, which may be the same width as web 10 or a different width as required, is drawn from a supply roll 31 and passes over a pair of heated calender rolls 32 and then between the driven pull rolls 33. A plurality of transversely arranged slitting members 34 are interposed between the rolls 32 and 33 to divide the web 11 into individual strips or ribbons 35 of uniform width. The ribbons 35 pass over individual tension applying rolls 36 arranged above the rolls 33.

An adhesive applying roll 37, arranged between the pull rolls 33 and the tension rolls 36, applies transversely extending longitudinally spaced lines of adhesive 38 to the individual strips 35, the lines in adjacent strips being arranged in longitudinally staggered relation. The adhesive roll 37 is supplied with adhesive from a pair of rollers 39 which are preferably enclosed in a refrigerated compartment 40. The adhesive material is supplied to the rolls 39 from fountains 41 by a delivery system 42.

The individual tension applying rollers 36 are mounted on bell cranks 43 which are mounted to pivot about a common pivot line 44 and tensioned by the springs 45. The tension in each spring 45 is adjustable to properly position the roller 36 for the length of the path which the strip carried by it is required to travel and to provide the desired tension in the strip. The strips 35 pass around the rolls 36 and thereby change their direction of travel by approximately 90 degrees. The strips 35 pass from the rolls 36 to the compacting rolls 27 and 28 and are progressively turned on edge and brought together into face-to-face relation. Guide rolls 29 and 30 guide the top and bottom edges of the strips 35 into alignment with the top and bottom edges of the strips 16 which are being delivered from the web 10.

The strips 16 and 35 are gathered into compacted formation by the rolls 27 and 28. The compacted material leaves the rolls 27 and 28 at an angle, as illustrated in Fig. 1, and passes between a pair of top and bottom guide rolls 46. The material is then subjected to the compacting and holding action of pairs of adjustably mounted carding belts 47 arranged on opposite sides of the material. While the material is held in compacted relation by the carding belts 47 it passes between heating plates 48 to set the transverse lines of adhesive 19 and 38.

The compacted material emerges from the carding belts 47 with the adhesive set and the material in condition to be expanded into the honeycomb formation. Exansion of the material is accomplished by a pair of jam rolls 49 which are arranged with their axes extending transversely or crosswise of the path of travel of the material and in longitudinally spaced relation to the carding belts 47. The jam rolls 49 engage the top and bottom surfaces of the material and are operated at a slower peripheral speed than the travel of the material as the material emerges from the carding belts 47. This operation forces the material to expand in the transverse direction.

A plurality of pairs of carding cloth belts are arranged, as illustrated in Figs. 2 and 4, intermediate the compacting and holding belts 47 and the jam rolls 49. The pairs of belts 50, 51, 52 and 53 are arranged in parallel side-by-side relation on one side of the material and each pair comprises an upper and lower belt engaging the top and bottom surfaces, respectively, of the material. The pairs of belts are arranged on a forward and outward angle relative to the center line of the expanding material with their inner ends adjacent the center line. The belts are operated to brush or wipe across the surface of the material in the outward direction. Corresponding pairs of belts 54, 55, 56 and 57 are arranged on the opposite side of the material with their inner ends adjacent the inner ends of the pairs of belts 50, 51, 52 and 53, respectively, and extending in a forward and outward direction at approximately right angles thereto. The cooperating pairs of belts running in opposite directions to each other progressively expand or spread out the honeycomb structure in cooperation with the jam rolls 49 which slow down the longitudinal movement of the material and also exert an expanding force on the material. In this manner the honeycomb structure is expanded to the desired width when it leaves the jam rolls 49.

After the honeycomb structure is expanded to the desired width it is adapted to be treated with a rigidifying material. Suitable mechanism may be provided for maintaining the honeycomb structure in its fully extended condition while applying the rigidifying material to the structure and setting or hardening the same to provide a rigid core structure. In the Lincoln and Thomson patent referred to mechanism is shown for rigidifying the core structure in a similar manner. The rigid core structure may be thereafter subjected to any further operations desired.

While the slitting operation is performed on the web prior to the application of the transverse adhesive lines in the illustrated form of the method and machine, it will be understood that the slitting or cutting of the web may be accomplished after the adhesive lines are applied. Suitable web slitting mechanism may be arranged between the adhesive applying mechanism and the individual strip tensioning and guiding rolls.

In the embodiment of the invention which has been described herein for purposes of illustration specific materials and details of construction have been referred to, but it will be appreciated that other materials and other details of construction may be resorted to within the spirit of the invention.

I claim:

1. In a machine for producing from a web of thin flexible material a relatively thick honeycomb structure in continuous ribbon-like form, means for continuously feeding the web of material along a predetermined path, means for separating the web into a plurality of relatively narrow individual strips extending lengthwise of the web, means for applying transverse lines of adhesive in longitudinally staggered relation on corresponding faces of adjacent strips, means for individually tensioning the respective strips and automatically adjusting the length of the path of movement of the same, means for turning the strips into edgewise relation, means to bring the strips together into face-to-face contact to thereby form a relatively thick compacted formation, means for maintaining the strips in compacted relation while the adhesive is set to connect the adjacent strips, and means for gradually expanding the connected strips to form a honeycomb structure which is adapted to be thereafter provided with a rigidifying material while it is maintained in expanded condition, all of said means being arranged along said path of movement of the material and being connected for operation in timed relation to the movement of the material.

2. In a machine for producing from a web of thin flexible material a relatively thick cellular core structure in continuous ribbon-like form, means for continuously feeding the web of material along a predetermined path, means for dividing the web into a plurality of relatively narrow individual strips extending lengthwise of the web, means for applying transverse lines of adhesive in staggered relation on corresponding faces of adjacent strips, means for continuously applying tension to the individual strips and adjusting the length of their path of travel, means for guiding the respective strips into edgewise face-to-face relation to thereby form a relatively thick ribbon-like formation, means for compacting the strips and allowing the adhesive to set to thereby connect the adjacent strips at longitudinally spaced points, and means for engaging top and bottom surfaces of the connected strips and urging the same outwardly of the center line thereof to form a cellular core structure, all of said means being arranged along said path of movement of the material and being connected for operation in timed relation to the movement of the material.

3. In a machine as recited in claim 2 wherein the means for engaging the top and bottom surfaces of the connected strips to urge them outwardly into the cellular core structure comprises a pair of transversely extending rolls which are operated at a slower peripheral speed than the travel of the compacted strips, and a plurality of pairs of carding belts arranged in angular relation to the longitudinal direction of travel of the material, said carding belts being operated in a direction to urge the material into laterally expanded condition.

4. A method of fabricating a relatively thick honeycomb core structure from a web of relatively thin flexible material which comprises feeding the web of material continuously along a predetermined path, dividing the web into a plurality of relatively narrow individual longitudinally extending strips each having a width approximately the same as the thickness of the desired core structure, applying longitudinally spaced transverse lines of adhesive to corresponding faces of the strips, the adhesive lines on one strip being in staggered relation to the adhesive lines on the adjacent strip, continuously adjusting the tension in the individual strips while guiding them into edgewise alternate face-to-face compacted relation, setting the adhesive to connect the compacted strips, and opening up the connected strips into a honeycomb structure.

5. A method of fabricating a relatively thick cellular core structure from a web of relatively thin paper-like material which comprises feeding the web of material continuously along a predetermined path, dividing the web into a plurality of relatively narrow longitudinally extending strips each having a width approximately the same as the thickness of the desired core structure, applying longitudinally spaced transversely extending lines of adhesive to corresponding faces of the strips, the adhesive lines on one strip being in staggered relation to the adhesive lines on the adjacent strip, applying tension to the individual strips independently of each other and automatically adjusting the length of the path which each strip travels independently of the remaining strips, guiding the strips into edgewise alternate face-to-face compacted relation, setting the adhesive to connect the compacted strips, and opening up the connected strips into a cellular core structure.

6. A method of fabricating a relatively thick cellular core structure from a web of relatively thin paper-like material which comprises feeding the web of material continuously along a predetermined path, cutting the web along parallel longitudinal lines to form a plurality of relatively narrow ribbons each having a width approximately the same as the thickness of the desired core structure, applying longitudinally spaced transversely extending lines of adhesive to corresponding faces of the ribbons, the adhesive lines on one ribbon being in staggered relation to the adhesive lines on the adjacent ribbon, adjusting the length of the path of travel of the individual ribbons and bringing them into edgewise alternate face-to-face compacted relation with the lines of adhesive on alternate ribbons substantially aligned transversely of the compacted material, setting the adhesive to connect the compacted ribbons, and opening up the connected ribbons into a cellular core structure.

7. A method of fabricating a relatively thick honeycomb core structure from a web of relatively thin flexible material which comprises feeding the web of material continuously along a predetermined path and in a taut condition, slitting the web into a plurality of relatively narrow strips of a width approximately the same as the thickness of the desired core structure, applying transverse lines of adhesive in staggered spaced relation to corresponding faces of adjacent strips, individually adjusting the tension in the strips, gathering the strips into alternate face-to-face relation, compacting the gathered strips, setting the adhesive to connect the compacted strips, and opening up the connected strips into a honeycomb structure which is adapted to be treated with a rigidifying material to form a rigid core structure.

8. A method of fabricating a relatively thick honeycomb core structure from a web of relatively thin flexible material which comprises feeding the web of material continuously along a predetermined path and in a taut condition, slitting the web into a plurality of relatively narrow strips of a width approximately the same as the thickness of the desired core structure, applying transverse lines of adhesive in staggered spaced relation to corresponding faces of adjacent strips, adjusting the length of the path of travel of the individual strips, gathering the strips into alternate face-to-face relation, compacting the gathered strips, setting the adhesive to connect the compacted strips, and expanding the connected strips into a honeycomb structure by retarding the lineal movement of the material.

9. A method of fabricating a relatively thick honeycomb core structure from a web of relatively thin flexible material which comprises feeding the web of material continuously along a predetermined path and in a taut condition, slitting the web into a plurality of relatively narrow strips of a width approximately the same as the thickness of the desired core structure, applying transverse lines of adhesive in staggered spaced relation to corresponding faces of adjacent strips, gathering the strips into alternate face-to-face relation, compacting the gathered strips, setting the adhesive to connect the compacted strips, and engaging the top and bottom surfaces of the connected strips to move the marginal portions thereof outwardly while the material moves forwardly to expand the same into a honeycomb structure.

10. A machine for producing from a web of thin flexible material a relatively thick honeycomb structure in continuous ribbon-like form which includes in combination means for continuously feeding the web of material along a predetermined path, cutting elements spaced transversely of said path for dividing the web into a plurality of relatively narrow individual strips of uniform width, means longitudinally spaced from said cutting elements along said path for applying transverse lines of adhesive in staggered spaced relation on corresponding faces of adjacent strips, means spaced along said path for guiding the respective strips into edgewise face-to-face relation, means cooperating with said guiding means for maintaining said individual strips in a substantially taut condition, means longitudinally spaced from said guiding means for compacting the strips, said compacting means extending for a substantial distance along said path to allow the adhesive to set whereby to connect the adjacent strips at longitudinally spaced points along the transverse adhesive lines, and means along said path longitudinally spaced from said compacted means for engaging said compacted and connected strips to spread the same laterally and open up the connected strips into a honeycomb structure of substantially uniform width.

11. A machine for producing from a web of thin flexible material a relatively thick honeycomb structure in continuous ribbon-like form which comprises in combination means for continuously feeding the web of material along a predetermined path, means spaced transversely of said path for slitting the continuously moving web into a plurality of relatively narrow strips, means spaced longitudinally of said slitting means along said path for applying transverse lines of adhesive in longitudinally staggered relation on corresponding faces of adjacent strips, means along said path for individually tensioning the respective strips, means cooperating with said tensioning means for bringing the strips into face-to-face relation to thereby form a relatively thick compacted formation, means longitudinally spaced from said last mentioned means to hold said strips in compacted formation during a substantial period of movement to permit the adhesive to set and thereby connect the adjacent strips along the transverse lines, and means along said path spaced from said holding means for opening up the connected strips laterally of the path of movement to form a honeycomb structure.

12. A machine for producing from a web of thin flexible material a relatively thick honeycomb structure in continuous ribbon-like form which comprises in combination means for continuously feeding the web of material lengthwise along a predetermined path, elements spaced transversely of said path for severing the web into a plurality of relatively narrow individual strips of uniform width, means adjacent said severing elements along said path for applying transverse lines of adhesive in staggered spaced relation on corresponding faces of adjacent strips, means adjacent said adhesive applying means for guiding the respective strips into face-to-face relation, means longitudinally spaced from said guiding means for compacting the strips, said compacting means extending a sufficient distance along said path to allow the adhesive to set whereby to connect the adjacent strips at longitudinally spaced points and means adjacent said compacting means for engaging said compacted and connected strips to spread the same laterally and open up the connected strips into a honeycomb structure of substantially uniform width.

13. A machine as recited in claim 12 wherein individual spring tensioned rollers are provided for engaging with the individual strips and maintaining the same in a substantially taut condition while they are brought into compacted relation.

14. A machine as recited in claim 12 wherein the means for compacting the strips after they are brought into face-to-face relation comprises opposed carding belts engaging the compacted strips on opposite sides thereof.

15. A machine as recited in claim 12 wherein the means for opening up the connected strips to form the honeycomb structure comprises a plurality of pairs of carding belts arranged on opposite sides of the compacted material to engage the top and bottom faces of the material along opposite sides thereof and move the same outwardly in opposite directions to fully expand the material to the desired width.

16. A machine as recited in claim 12 wherein the means for opening up the connected strips comprises a pair of transversely extending jam rolls engaging the top and bottom surfaces of the material, said rolls being operated at a slower rate of speed than the travel of the material as it emerges from the compacting and adhesive setting means whereby to force the material to expand in a lateral direction to the desired width.

17. A machine as recited in claim 16 wherein the means for opening the connected strips also comprises angularly related pairs of carding belts arranged on opposite sides of the material between the compacting and adhesive setting means and the transversely extending jam rolls, said carding belts being operated to engage the top and bottom surfaces of the material and urge the same in a lateral direction relative to the longitudinal path of travel of the material.

18. In the manufacture of an open cellular structure, the method of making an initial closed cellular core adapted to be subsequently expanded to produce the open cellular structure, which comprises moving a web of relatively thin sheet material in the direction of its length, progressively severing the web on longitudinal lines to form a plurality of relatively narrow longitudinal extending strips each of a width approximately the same as the thickness of the desired cellular structure, thereafter progressively turning the strips on edge and into face-to-face relation, and progressively securing adjacent strips together at longitudinally spaced points only, with the points of attachment of each strip and the adjoining strips on opposite sides thereof being in staggered longitudinal spaced relation.

19. In the manufacture of an open cellular structure the method of making an initial closed cellular core adapted to be subsequently expanded to produce the open cellular structure, which comprises moving a web of relatively thin sheet material in the direction of its length, cutting the web during its movement into a plurality of relatively narrow longitudinal extending strips of a width approximately the same as the thickness of the desired cellular structure, thereafter progressively turning the strips on edge and into face-to-face relation, and progressively securing adjacent strips together at longitudinally spaced points only, with the points of attachment of each strip and the adjoining strips on opposite sides thereof being in staggered longitudinal spaced relation.

JOHN D. LINCOLN.

References Cited in the file of this patent

UNITED STATES PATENTS

| Number | Name | Date |
|---|---|---|
| 929,876 | Pulsifier | Aug. 3, 1909 |
| 1,103,033 | Clark | July 14, 1914 |
| 1,924,472 | Thomson | Aug. 29, 1933 |
| 2,161,831 | Manning | June 13, 1939 |
| 2,366,130 | Slavek | Dec. 26, 1944 |
| 2,368,445 | Brandt | Jan. 30, 1945 |
| 2,369,006 | Banks | Feb. 6, 1945 |
| 2,428,979 | May | Oct. 14, 1947 |
| 2,475,789 | Kunz | July 12, 1949 |
| 2,553,054 | Lincoln et al. | May 15, 1951 |